(12) United States Patent  
Suter et al.

(10) Patent No.: US 7,772,506 B2
(45) Date of Patent: Aug. 10, 2010

(54) FLUID-TIGHT CABLE DUCT

(75) Inventors: Roger Suter, Zurich (CH); Georg Kleynhans, Bülach (CH); Peter Ortmann, Schaffhausen (CH)

(73) Assignee: Man Turbo AG Schwiez, Zurich (CH)

( * ) Notice: Subject to any disclaimer, the term of this patent is extended or adjusted under 35 U.S.C. 154(b) by 452 days.

(21) Appl. No.: 11/794,050

(22) PCT Filed: Dec. 23, 2005

(86) PCT No.: PCT/EP2005/057169

§ 371 (c)(1),
(2), (4) Date: Jun. 22, 2007

(87) PCT Pub. No.: WO2006/069987

PCT Pub. Date: Jul. 6, 2006

(65) Prior Publication Data

US 2008/0017415 A1 Jan. 24, 2008

(30) Foreign Application Priority Data

Dec. 23, 2004 (EP) .................... 04030602

(51) Int. Cl.
*H02G 3/22* (2006.01)
(52) U.S. Cl. .................. 174/650; 174/21 R; 174/22 R; 174/24; 137/797
(58) Field of Classification Search ............... 174/650, 174/68.1, 68.3, 480, 481, 21 R, 22 R, 24, 174/47, 77 R; 138/177, 178, 26; 137/797, 137/798
See application file for complete search history.

(56) References Cited

U.S. PATENT DOCUMENTS

| 2,605,315 | A | * | 7/1952 | Hargett | 174/77 R |
| 4,454,381 | A | * | 6/1984 | Ito et al. | 174/650 |
| 5,408,740 | A | * | 4/1995 | Dee | 174/650 |
| 5,611,680 | A | * | 3/1997 | Small et al. | 174/47 |
| 6,196,553 | B1 | * | 3/2001 | Arab-Sadeghabadi et al. | 174/77 R |

FOREIGN PATENT DOCUMENTS

GB 2217871 A 11/1989

* cited by examiner

*Primary Examiner*—Angel R Estrada
(74) *Attorney, Agent, or Firm*—Pearl Cohen Zedek Latzer, LLP

(57) ABSTRACT

The invention relates to a fluid-tight cable duct (1) which is used to guide a cable (2) into a chamber (3) which can be impinged upon by pressure, and which comprises a housing (4), at least one cable (2) and one first and one second seal (5a, 5b) which can be pressure-loaded. The two pressure-loaded seals (5a, 5b) and the housing (4) define an inner hollow chamber (4d), and the cable (2) enters into the inner hollow chamber (4d) via the first seal (5a), through which the inner hollow chamber (4d) extends, and exits the inner hollow chamber (4d) via the second seal (5b). The inner hollow chamber (4d) comprises a pressure discharge opening (4c) which leads into an outer chamber (6) which is located outside the chamber (3) which can be impinged upon by pressure.

16 Claims, 3 Drawing Sheets

B-B

FLUID-TIGHT CABLE DUCT

CROSS-REFERENCE TO RELATED APPLICATIONS

Figure 1:
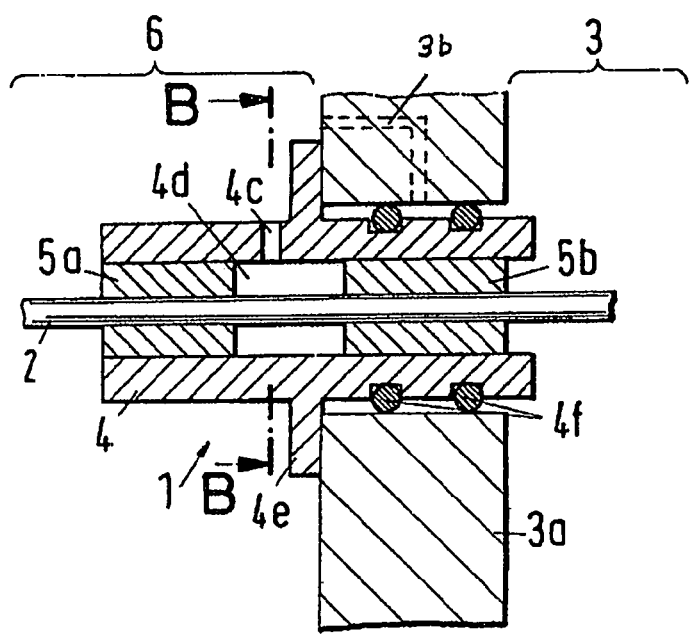

This application is a National Phase Application of PCT International Application No. PCT/EP2005/057169, International Filing Date Dec. 23, 2005, claiming priority of European Patent Application No. 04030602.9, filed Dec. 23, 2004.

The invention relates to a fluid tight line lead-through in accordance with the preamble of claim 1.

It is known to guide electrical lines through the wall of a pressure container in order for example to supply drive means arranged within the pressure container from the outside with electrical energy or for example to enable a data exchange with the aid of monitoring leads, control leads or regulating leads to sensors and actuators arranged in the interior of the pressure container. Thus, for example with a turbocompressor, the entire compressor and also the drive apparatus can be arranged within a pressure container. For the supply of energy and also for the control and monitoring of the turbocompressor and of the motor a plurality of lines extending through the wall of the pressure container is required, in particular when the rotating parts are to be journalled in contact-free manner with the aid of magnetic bearings.

A disadvantage of known line lead-throughs which are used with housings which stand under pressure is the fact that leakage can occur at the line lead-throughs so that, for example, gas can flow outwardly in an uncontrolled manner.

This is in particular dangerous when a pressure built-up occurs unnoticed in certain parts of the plant and this suddenly stands under an unexpectedly high pressure or when a danger of explosion arises as a consequence of the gas escape.

It is the object of the present invention to propose a reliable and cost-favourable line lead-through which is suitable for pressurizable spaces.

This object is satisfied with a fluid tight line lead-through having the features of claim 1. The subordinate claims 2 to 16 relate to further advantageous designs.

The object is in particular satisfied with a fluid tight line lead-through for the leading of a conductor into a pressurizable space, with the line lead-through including a housing, at least one conductor and also a first and a second pressure loadable seal, with the two pressure loadable seals and the housing bounding an internal hollow space, with the conductor entering via the first seal into the internal hollow space, extending through the internal hollow space and emerging from the internal hollow space via the second seal and wherein the internal hollow space has a pressure relief opening which opens into an external space which is located outside of the pressurizable space.

The line lead-through in accordance with the invention has the advantage that, when a seal leaks, the gases flow out of the pressurizable space of the seal flow into the internal hollow space of the line lead-through and are given off from this internal hollow space via the pressure relief opening in controlled manner into an outer space. In this way it is, on the one hand, ensured that the leakage gas which flows into the line lead-through does not bring about any uncontrolled pressure built-up in the line lead-through. On the other hand, it is ensured that the inflowing leakage gas is supplied to a defined outer space in controlled manner. Through this controlled lead off of the gas, the entire line lead-through remains fluid tight. Moreover, a danger of explosion is precluded.

The line in the line lead-through is preferably designed as an electric conductor, in particular a rod-like electrical conductor. The conductor can however also be designed as a waveguide for light.

In a preferred embodiment the line lead-through is designed as a plug connector including a first and a second housing part each having a conductor which, in the plugged-in state, are connected to one another and are in particularly electrically conductingly connected. The plug connection can, for example, have a single conductor or also a plurality of mutually connecting conductors. The conductors can for example be designed to transmit control signals in the range from mV to V or mA. The conductors could also be used for energy supply, for example of motors arranged within the housing and could thus be designed from the transmission of currents and/or voltages in the range from kA and kV. The fluid tight and gas tight line lead-through in accordance with the invention is in particular suitable for fields of application with differential pressures in the range between 5 bar and 500 bar.

The line lead-through in accordance with the invention is for example suitable for use in combination with turbocompressors, in particular with magnetically journalled turbocompressors in which the entire electrical driving motor and also all compressor stages are arranged in a common pressure housing. With a turbocompressor of this kind a plurality of energy lines and control lines are to be conducted through the pressure housing with line lead-throughs. The line lead-throughs in accordance with the invention are particularly suitable for long term operation of such a turbocompressor which requires little service and is reliable.

Figure 3:
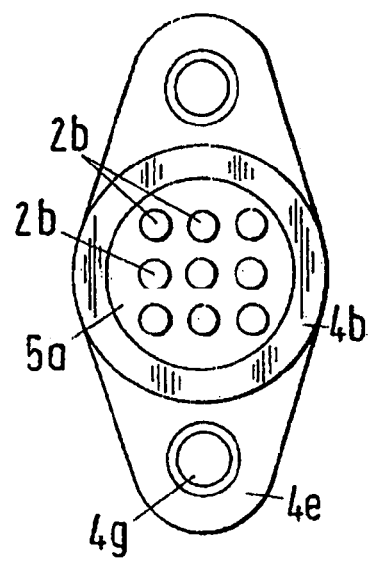
Figure 2:
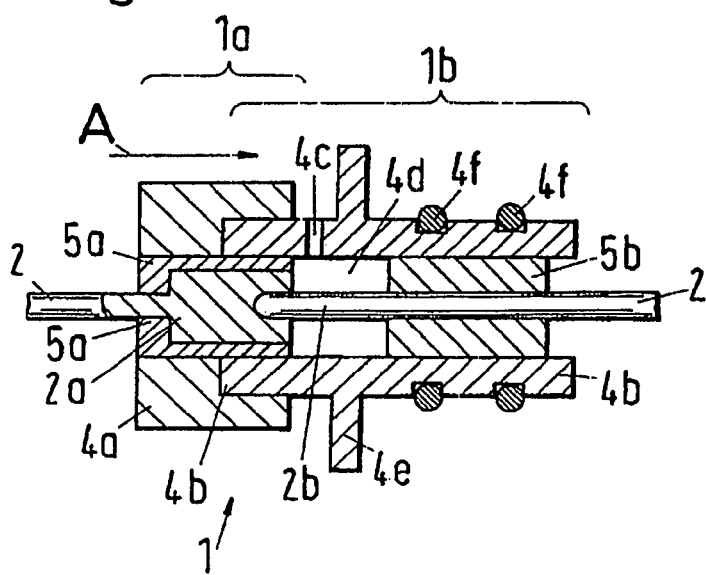
Figure 4:
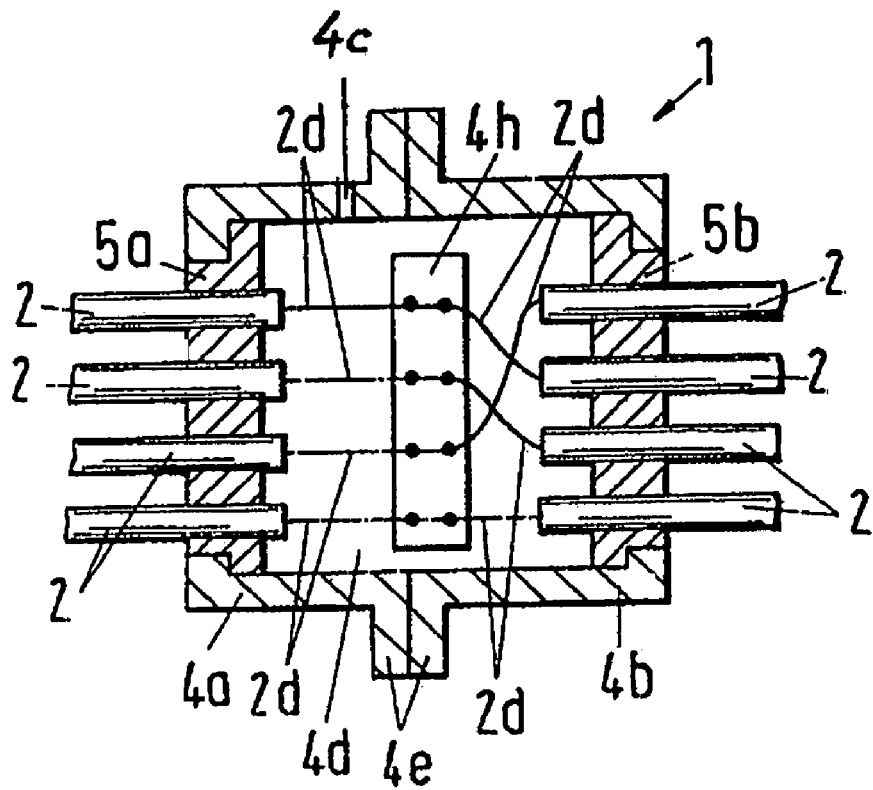
Figure 5:
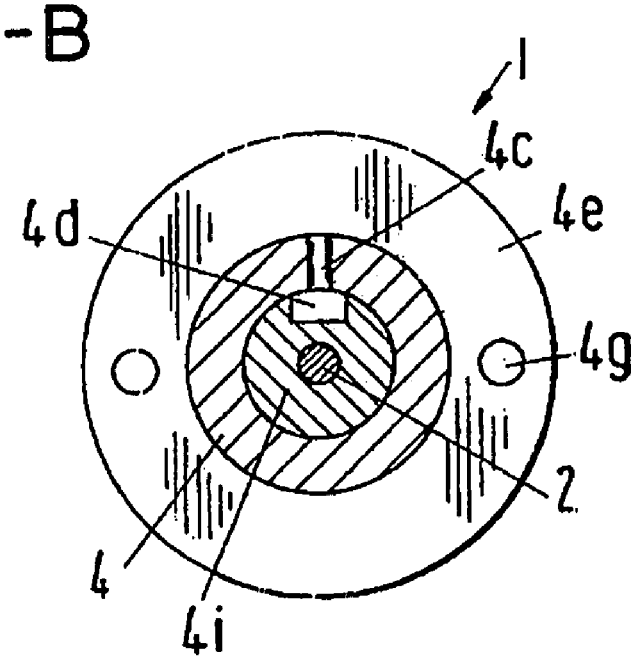
Figure 6:
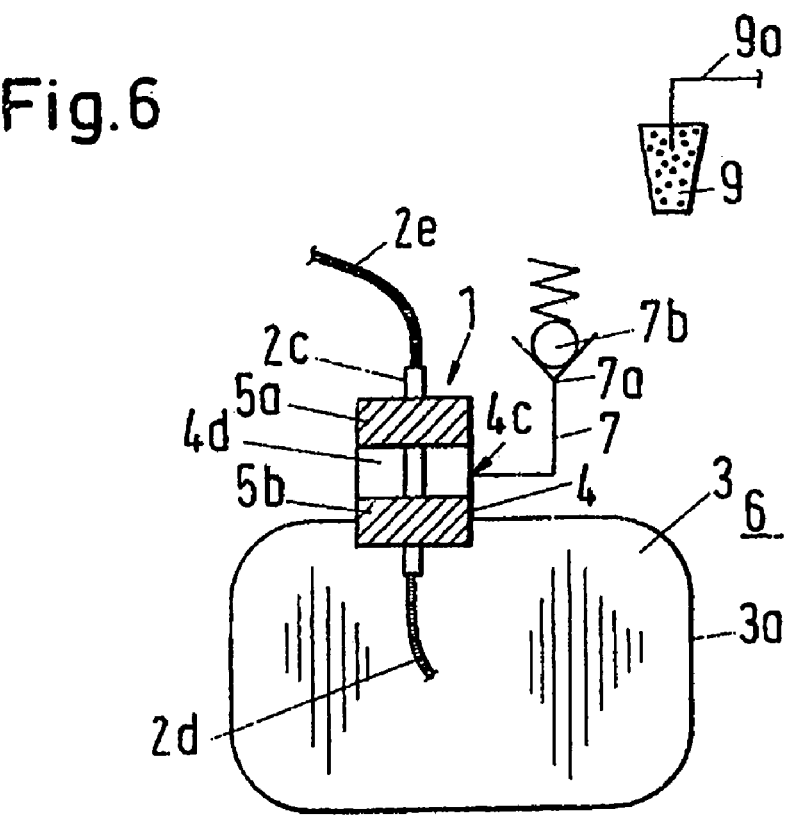
Figure 7:
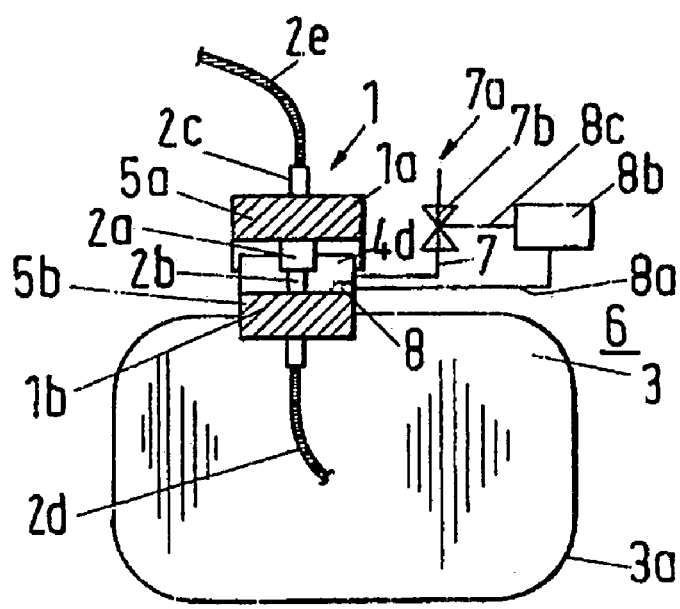

The invention will be described in the following with the aid of Figures and with reference to different embodiments. There are shown:

FIG. 1 a longitudinal section through a line lead-through;

FIG. 2 a longitudinal section through a second embodiment of a line lead-through;

FIG. 3 a view from the direction A onto a multi pole line lead-through designed as a plug connection;

FIG. 4 a longitudinal section through a third embodiment of a line lead-through;

FIG. 5 a section (B-B) through a further embodiment of a line lead-through;

FIG. 6 schematically a pressure container with a line lead-through;

FIG. 7 schematically a pressure container with a further line lead-through.

FIG. 1 shows a line lead-through 1 made in one piece including a housing 4 having attachment flange 4e, inner space 4d and pressure relief opening 4c. The line lead-through 1 moreover includes an electric conductor 2 and also a first and a second seal 5a, 5b through which the conductor 2 passes. The second seal 5b will be termed a primary seal or main seal in the following. The first seal 5a will also be termed a secondary seal in the following. These two seals 5a, 5b are arranged such that they bound an internal hollow space 4d together, with the wall of the housing 4 which has, at its only opening, a non-closed fluid or gas permeable pressure relief opening 4c extending through the housing wall (also termed "non-sealed" in English). In the illustrated embodiment the conductor 2 is designed as en electric conductor, in particular as a metallic rod. In this embodiment the two seals 5a, 5b consist of an electrically insulating material such as plastic or ceramic. The conductor 2 could also be surrounded by an insulating layer or designed as an insulated conductive wire. The conductor 2 could for example also consist of a waveguide of glass fibre for light. In this arrangement the two seals 5a, 5b could also consist of an electrically conductive material for example of metal. These seals simultaneously form a pressure barrier. At least the seal 5b is made so that it can be pressure loaded and thus withstand the applied pressure difference between the internal space 3 and the internal hollow space 4. In a preferred embodiment the pressure in the internal hollow space 4d corresponds to approximately one bar. The pressure in the internal hollow space 4d can, depending on the leakage quantity flowing through the second seal 5b, adopt values up to the pressure level of the inner space 3. Consequently, the first pressure loadable seal 5a is preferably designed such that this is able to take up the pressure of the internal space 3. The pressure in the internal space 3 can amount to up to 500 bar depending on the application. If the seal 5b becomes leaky for whatever reason, then the fluid, preferably gas, passes from the internal space 3 into the internal hollow space 4d and is disposed of thereafter via the opening 4c. The gas emerging from the opening 4c flows into an outer space 6 which is located outside of the pressure loadable space 3. In an advantageous embodiment the opening 4c is connected to the atmosphere via a fluid conducting line so that the gas which emerges is directed into the atmosphere so that, even with an untight seal 5b, a fluid tight line lead-through 1 exists between the inner space 3 and the outer space 6 shown in FIG. 1.

The line lead-through 1 is preferably used in combination with a pressure housing 3a. FIG. 1 shows schematically a pressure housing 3a with a pressure loadable inner space 3, with the pressure housing 3a having a circular aperture in which the cylindrical line lead-through 1 is arranged. Two sealing rings 4f seal the gap between the pressure housing wall 3a and the housing 4 so that the conductor 2 is guided in fluid tight manner, in particular in gas tight manner, from the inner space 3 into the outer space 6 located outside the pressure housing. In an advantageous embodiment a fluid conducting connection 3b to the outer space 6, to another space or to the atmosphere can be provided between the sealing rings 4f. This bore 3b which is only shown in broken lines in FIG. 1 serves for the pressure relief in order to prevent an excessive pressure in the space between the sealing rings 4f, which could arise as a result of a leakage of the sealing ring 4f arranged at the right. The fluid flowing through the bore 3b is advantageously led away in controlled manner in that the bore opens into flow influencing means such as valves and lines which permit a controlled pressure relief. The housing 4 can be connected in different manners to the pressure housing 3a, for example by welding or brazing.

FIG. 2 shows in a longitudinal section a further line lead-through 1 which, in distinction to the embodiment shown in FIG. 1, is designed as a plug connection. The plug connection includes a first plug connector part 1a and a second plug connector part 1b which are mutually releasable. The second plug connector part 1b with the second housing part 4b is, for example, firmly connected to the pressure housing 3a, for example via the flange 4e as shown in FIG. 1. The first plug connector part 1a includes a female line connector 2a which is connected via a first seal 5a to the first housing part 4a. A male line connector 2b is arranged in the internal hollow space 4d with these two line connectors 2a, 2b and the two housing parts 4a, 4b being capable of being connected by being plugged together. Between the two housing parts 4a, 4b further, non-shown, fastener elements such as threads or securing elements can be provided in order to additionally ensure a firm or secure connection of the two housing parts 4a, 4b.

The plug connection shown in FIG. 2 has a pressure relief opening 4c so that, if the pressure loadable seal 5b becomes slightly leaky, no uncontrolled pressure can build up in the internal hollow space 4d. Should the second pressure loadable seal 5b have a larger leakage then a pressure builds up in the internal hollow space 4d, in particular with a small pressure relief opening 4c, so that in this case it is particularly important for the first seal to be loaded as far as possible up to the pressure which exists in the internal space 3.

The line lead-through 1 can, as shown in FIG. 2, be designed for the leading through of a single conductor 2.

FIG. 3 shows, in a view from the direction A shown in FIG. 2, a second housing part 4b with a total of nine metallic male line connectors 2b which are arranged and held in an electrically insulating seal 5b. The second housing part 4b can be secured with the aid of a flange 4e having bores 4g to the outer wall of the pressure housing 3a. The line lead-through 1, which can be designed as in FIG. 2 as a plug connection or as in FIG. 1 as a lead-through, can have one conductor or, with the appropriate design, any desired number of conductors 2.

Basically each pressure carrying line lead-through 1 can fail with the consequence of an uncontrolled gas leakage under certain circumstances.

With a plug connection in the non-movable plug connector part 1b, the primary pressure transmitting sealing element 5b is fixedly mounted on the pressure container 3a. Each sealing element 5b can have one or a plurality of line lead-throughs. The movable plug connector part 1a is connected to a cable which has one conductor or a plurality of conductors 2 or leads which can consist of a plurality of wires. The immovable and the movable parts of the plug connection 1a, 1b are fixedly and sealingly connected to one another in the operating state and form an enclosed volume 4d in their interior.

The line lead-through in accordance with the invention avoids a pressure build-up to taking place in the enclosed volume 4d of the plug connection 1a, 1b should the primary pressure carrying sealing element 5b fail. This pressure build up would otherwise lead to a situation in which, in particular with incorrect assembly of the movable part of the plug connection 1b, gas could migrate along the conductor wires through the cable into not appropriately certified zones. In order to avoid this secondary leakage, the movable part of the plug 1a is equipped with a second pressure carrying barrier 5a. The line lead-throughs into the plug connector parts 2a, 2b are preferably formed of solid rods, in particular in order to avoid the leakage which is possible when using stranded wire as conductor 2.

The failure of the primary seal 5b can take place in different ways. On the one hand, a gradual loss of the sealing function is conceivable, caused for example by temperature fluctuations and the internal stresses associated therewith. On the other hand, a direct destruction of the sealing function can take place, for example through the action of external mechanical forces. In the former case, and also in the second case, it is ensured, thanks to the pressure relief opening, that the faulty function of the pressure carrying sealing element cannot lead to an excessive pressure build up in the interior volume of the plug connection 4d. Otherwise the pressure of the actual pressure container would set in in a short period of time especially with a small internal volume 4d within the plug, on the assumption that the housing 4 of the plug connection can withstand the internal pressure.

The line lead-through 1 in accordance with the invention, in particular designed as a plug connection, includes an internal volume 4d which, from the fluid technical viewpoint has an outlet and is in particular connected to the environment. In this way, it is ensured that the internal volume of the plug connection does not remain permanently pressure loaded with a defective sealing element 5b. In dependence on the size of the opening to the environment and the leakage of the primary sealing element 5b a corresponding pressure would however arise in the interior volume 4d. This leakage can be monitored by means of sensors, for example a pressure sensor or a gas detector and if necessary an alarm could also be triggered.

FIG. 4 shows schematically a housing 4 which consists of two housing parts 4a, 4b which are screwed to one another in a gas tight manner. The housing part 4a includes a pressure relief opening 4c. Each housing part 4a or 4b includes in each case one seal 5a and 5b through which in each case four rigid conductors 2 extend. The rigid conductors 2 are connected within the housing 4 to flexible conductors 2d. A connection device 4h is arranged within the housing 4 in order to connect the flexible conductors 2d together and, if required, to also separate them again. In a preferred embodiment the flexible conductors 2d are manufactured from stranded wire and the connection device 4h is designed as a clamping rail so that the flexible conductors 2d can be secured with the aid of screws to the connection device 4h and in addition so that a mutual electrical contact is formed between preferably two conductors 2d in each case. The conductors 2d could however also be designed as waveguides for light.

FIG. 5 shows, in a section along the line B-B shown in FIG. 1, a further embodiment of a line lead-through 1. The internal hollow space 4d shown in FIG. 1 is partly filled in the embodiment of FIG. 5 with a filling material such as an insulator 4i so that the internal hollow space 4d becomes smaller as shown in FIG. 5. The internal hollow space 4d ensures a fluid tight connection along the space between the first and second seals 5a, 5b and also along the pressure relief opening 4c. The insulator 4i is preferably designed as an electric insulator and can be provided in the most diverse manner with internal hollow spaces 4d for the conduction of the fluid. The insulator 4i consists preferably of a solid body. However a liquid could also be used as the insulator 4i, for example oil which partly fills the internal hollow space 4d.

FIG. 6 schematically shows a pressure housing 3a with a pressure loadable internal space 3 with a line lead-through 1 being arranged at the pressure housing 3a and guiding an electric conductor 2 in fluid and/or gas tight manner from the inner space 3 to the outer space 6. The internal hollow space 4d bounded by the pressure loadable seals 5a, 5b is fluid conductingly connected to the valve 7b with outlet opening 7a via the pressure relief opening 4c and the line 7. The valve 7b has a spring with the pressure level at which the valve 7b opens preferably being adjustable by the spring force. A gas sensor 9 with an electric lead 9a is arranged in the outer space 6. The gas sensor 9 is able to recognize gas which emerges from the valve 7b. In the illustrated embodiment the conductors 2d, 2e are designed as flexible metallic conductors, for example as stranded leads. These leads 2d, 2e are electrically conductingly connected to the bar-like metallic conductor 2.

The pressure housing 3a could be designed as pressure housing of a turbocompressor including a turbocompressor and also an electric motor. The fluid conducting inlets and outlets of the turbocompressor are not shown. For the energy supply of the electric motor a plurality of the line lead-throughs shown in FIG. 1 would be arranged at the pressure housing 3a in order to supply the electric motor with an energy of for example 1 Megawatt. For the control or regulation of the turbocompressor a waveguide for light or a plurality of lines would, for example, be required which transmit signals in the range up to a few volts. Such control lines could, as shown for example in FIG. 3, be supplied via a line lead-through 1 designed as a plug connector and including a plurality of individual conductors 2b.

FIG. 7 schematically shows in turn a pressure housing 3a with a pressurizable space 3, with the line lead-through 1 being designed as a plug connection with a first and second plug connection part 1a, 1b. A sensor 8 is arranged in the internal hollow space 4d of the line lead-through 1. This sensor 8 can however also be disposed outside of the plug connection, for example in that the sensor 8 is connected via a fluid conducting connection to the pressure applied in the internal hollow space 4d. The sensor 8 could also be arranged in a control cable outside of the plug on a rack especially provided therefore. The pressure relief opening 4c is connected via fluid line 7 and a valve 7b with the outlet opening 7a. The valve 7b could also be arranged within the pressure relief opening 4c. A monitoring device 8b detects the value of the sensor 8, for example a pressure sensor or a gas sensor, via the electric line 8a and regulates the valve 7b, via an electrical line 8c. The valve 7b is for example opened on exceeding a predeterminable pressure prevailing in the internal hollow space 4d. The line lead-through 1 can be designed as a three phase plug connection and be designed for the transmission of electrical energy in the range of kA and kV. The line lead-through 1 can however also have a plurality of plug connections and be designed to transmit electrical signals in the range from mV to V or mA to A. The line lead-throughs 1 in accordance with the invention can be constructed in most diverse shapes. In particular, when they are designed as a plug connection, the second plug connector part 1b can also be designed such that a normed first plug connection part 1a customary in commerce can be introduced. The plug connection shown in FIG. 7 preferably has a non-illustrated sealing ring which seals off the space between the first and second plug connector parts 1a, 1b so that the internal hollow space 4d is fluid tight with respect to the outer space 6.

The line lead-through 1 shown in FIGS. 1 and 2 is preferably designed as a built-in part which is secured to a pressure housing 3a. The line lead-through 1 can be connected in diverse manners to the pressure housing 3a, for example also by welding, chemical welding or brazing. The housing 4 of the line lead-through 1 can for example consist of metal or plastic. By way of example, the first plug connection part 1a can also consist of metal and a second plug connection part 1b can consist of a different material such as plastic.

The pressure relief opening 4c can have a geometrical design such that an additional action is exerted thereby on the out-flowing fluid, for example in that heat is extracted to an increased degree from the fluid flowing through the pressure relief opening 3c. By way of example the pressure relief opening 4c could be designed as a long thin bore or gap which has the task of cooling down the out-flowing fluid or gas, so that the gas emerging from the pressure relief opening 4c has reduced temperature. This can prove advantageous if the danger of a deflagration, also called a low speed detonation exists. If such a rapid combustion process should occur in the internal hollow space 4d, then the hot gases produced thereby will be additionally cooled down on passing through the pressure relief opening 4c so that the emerging gases have a correspondingly reduced or lower temperature.

The line lead-through in accordance with the invention is in particular suitable for use on platforms arranged above the water, in particular for platforms for oil production.

The invention claimed is:

1. A fluid tight line lead-through for the leading of a conductor into a pressurizable space, including a housing, at least one conductor and also a first and a second pressure loadable seal, with the two pressure loadable seals and the housing bounding an internal hollow space, with the conductor entering via the first seal into the internal hollow space, extending through the internal hollow space and emerging from the internal hollow space via the second seal and wherein the internal hollow space has a pressure relief opening which opens into an external space which is located outside of the pressurizable space, wherein the conductor is an electrical conductor having a rod-like design.

2. A linelead-through in accordance with claim 1, characterized in that it is designed as a plug connection, with the housing including a first and a second housing part which are releasably connectable and wherein the conductor includes a first connection part and a second connection part which are so designed and arranged that the plug connection has a conductive connection between the first and the second connecting parts in the plugged together state within the housing.

3. A line lead-through in accordance with claim 2, characterized in that it has a plurality of connectable conductors.

4. A line lead-through in accordance with claim 1, characterized in that a connection device is arranged within the housing which permits the conductor to be connected and/or to be separated.

5. A line lead-through in accordance with claim 4, characterized in that the conductor is flexibly designed within the housing.

6. A line lead-through in accordance with claim 4, characterized in that the connection apparatus is designed in such a way that a plurality of conductors are mutually connectable.

7. A line lead-through in accordance with claim 1, characterized in that the first and the second seal include an electrical insulator through which the conductor passes.

8. A line lead-through in accordance with claim 1, characterized in that the conductor consists of metal.

9. A line lead-through in accordance with claim 1, characterized in that a sensor is provided in such a way that it can at least monitor the pressure applied in the internal hollow space.

10. A line lead-through in accordance with claim 1, characterized in that the pressure relief opening is fluid conductingly connected to a valve and in that the valve is fluid conductingly connected to an outlet opening which opens into the outer space.

11. A line lead-through in accordance with claim 10, characterized in that the valve is controllable.

12. A line lead-through in accordance with claim 1, characterized in that a valve is arranged in the pressure relief opening and in that the valve is fluid conductingly connected to the outer space.

13. A line lead-through in accordance with claim 1, characterized in that the conductors consists of a light waveguide or include a light waveguide.

14. A line lead-through in accordance with claim 1, characterized in that the internal hollow space is partly filled with a liquid or solid insulator.

15. A line lead-through in accordance with claim 1, characterized in that the pressure relief opening is geometrically designed in such a way that heat is extracted from a fluid flowing through the pressure relief opening.

16. A pressure loadable apparatus including a line lead-through in accordance with claim 1.

* * * * *